United States Patent
Boyle et al.

(10) Patent No.: US 7,086,813 B1
(45) Date of Patent: *Aug. 8, 2006

(54) QUICK-ACTING TOOL BIT HOLDER

(75) Inventors: David C. Boyle, Severna Park, MD (US); Timothy T. McKenzie, Cockeysville, MD (US)

(73) Assignee: Black & Decker Inc., Newark, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 10/470,610

(22) Filed: Aug. 25, 1999

Related U.S. Application Data

(63) Continuation-in-part of application No. 09/105,661, filed on Jun. 26, 1998, now Pat. No. 6,053,675.

(51) Int. Cl.
*B23B 31/107* (2006.01)

(52) U.S. Cl. .................. 408/239 R; 279/82; 279/145

(58) Field of Classification Search ............... 408/238, 408/239 R; 279/23.1, 29, 76, 79, 80, 82, 279/84, 86, 143, 145, 155, 906
See application file for complete search history.

(56) References Cited

U.S. PATENT DOCUMENTS

| | | | | |
|---|---|---|---|---|
| 632,560 | A | * | 9/1899 | Furbish ................... 279/82 |
| 1,138,465 | A | * | 5/1915 | Fegley et al. ............ 279/82 |
| 1,209,572 | A | * | 12/1916 | Fegley .................... 279/82 |
| 1,653,762 | A | * | 12/1927 | Fegley et al. ............ 279/82 |
| 2,663,910 | A | | 12/1953 | Danielson et al. |
| 3,031,722 | A | | 5/1962 | Gits |
| 4,155,972 | A | | 5/1979 | Hauser et al. |
| 4,577,875 | A | * | 3/1986 | Miyakawa ............... 279/75 |
| 4,701,083 | A | * | 10/1987 | Deutschenbaur et al. ... 408/240 |
| 5,000,631 | A | * | 3/1991 | Deutschenbaur et al. ... 408/240 |
| 5,062,749 | A | * | 11/1991 | Sheets ..................... 279/75 |

(Continued)

FOREIGN PATENT DOCUMENTS

GB    2 274 615    8/1994

(Continued)

*Primary Examiner*—Daniel W. Howell
(74) *Attorney, Agent, or Firm*—Harness, Dickey & Pierce, P.L.C.

(57) ABSTRACT

A "snap-in" bit chuck assembly for a rotary hand or powered tool, includes an elongated body having a hex shank at its rearward end, an elongated retraction collar slidably disposed on the body, and an outer retaining collar fixed to the forward end of the body. The body has a coaxial hex socket formed therein to allow a reversible tool to be inserted thereinto. A slot is formed in the body, between the outer surface of the body and the internal hex socket. A coil spring surrounds the body, inside the retraction collar, and normally biases the retraction collar forwardly and biases a retaining clip toward the bottom of the angular slot. The retaining clip slides outwardly in the angular slot, against the bias of the coil spring, as the reversible tool is inserted, where a recess on the reversible tool is engaged and retained by the clip. The tool is removed by sliding the retraction collar rearwardly, to compress the coil spring and allow the retaining clip to retract back up the slot. The clip is directly engaged by the coil spring and has two legs extending about the body so that the clip is self-retaining. The clip legs extend around the body such that the retraction force on the coil spring is directed through the center of the coil spring to keep it coaxially aligned with the body.

14 Claims, 4 Drawing Sheets

U.S. PATENT DOCUMENTS

| | | | |
|---|---|---|---|
| 5,447,397 A * | 9/1995 | Asano | 408/59 |
| 5,470,180 A * | 11/1995 | Jore | 408/239 R |
| 5,709,393 A * | 1/1998 | von Keudell et al. | 279/97 |
| 5,740,586 A | 4/1998 | Gomas et al. | |
| 6,053,675 A * | 4/2000 | Holland et al. | 408/239 R |
| 6,474,656 B1 * | 11/2002 | Thomas | 279/30 |
| 6,860,489 B1 * | 3/2005 | Chen | 279/82 |
| 6,863,280 B1 * | 3/2005 | Chiu | 279/82 |

FOREIGN PATENT DOCUMENTS

| | | | |
|---|---|---|---|
| WO | 98/51450 | * 11/1998 | 279/82 |

* cited by examiner

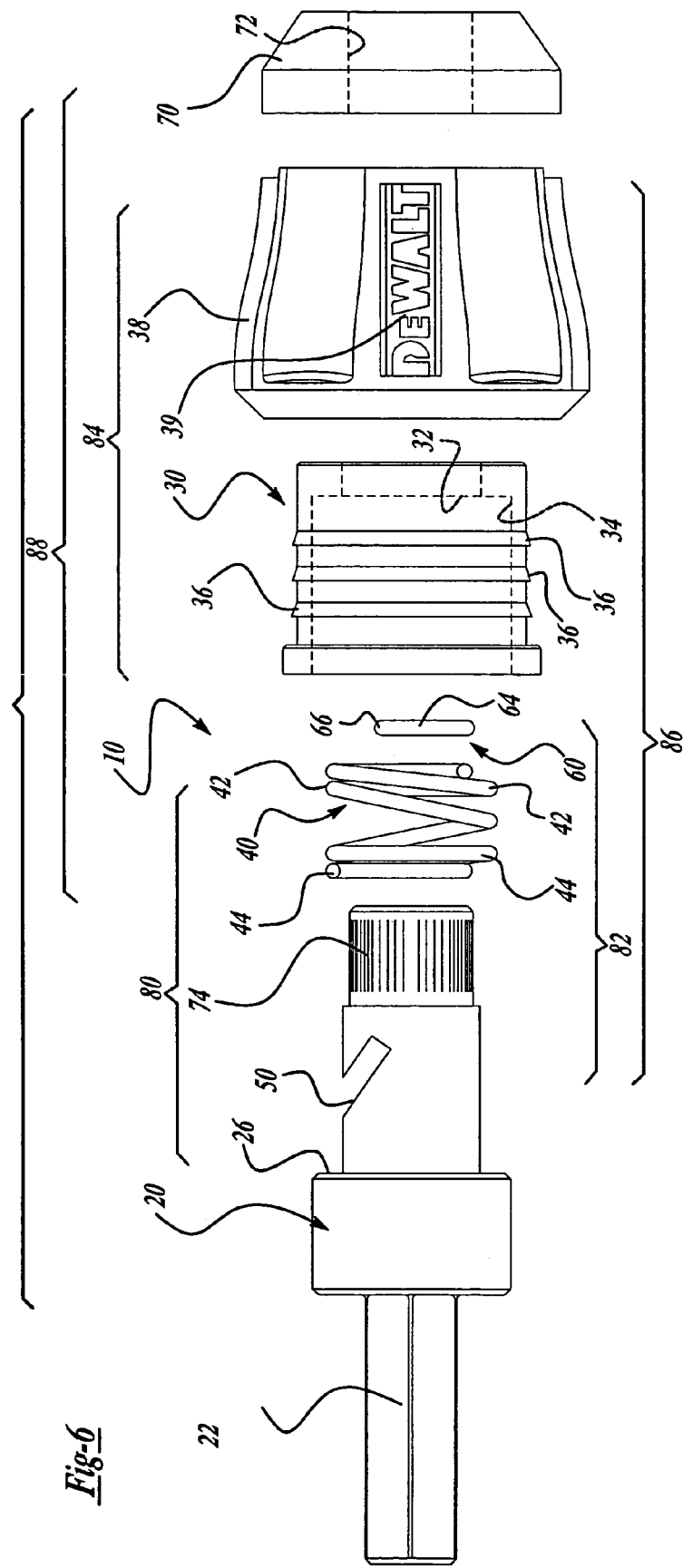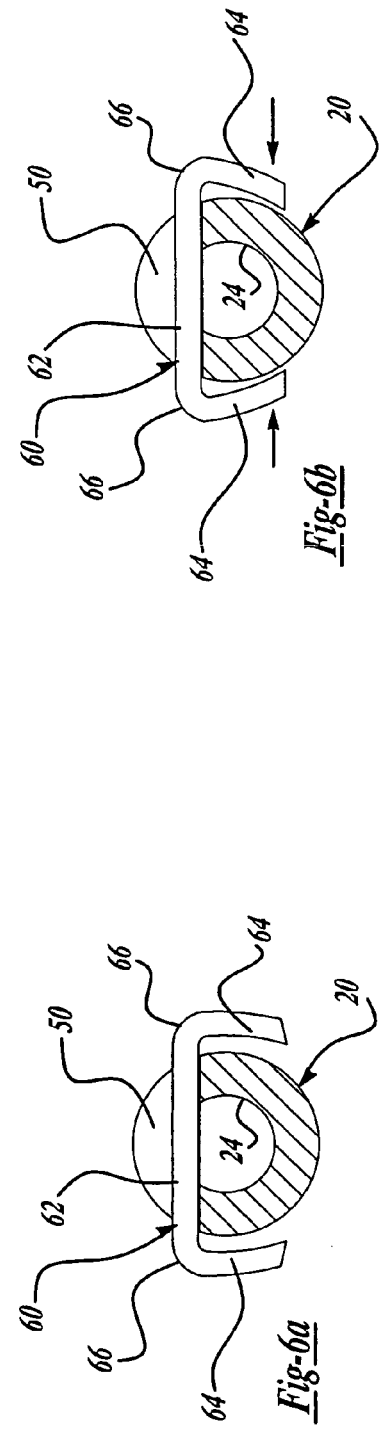

QUICK-ACTING TOOL BIT HOLDER

CROSS-REFERENCE TO RELATED APPLICATION

This application is a continuation-in-part application of U.S. application Ser. No. 09/105,661 filed Jun. 26, 1998 now U.S. Pat. No. 6,053,675 entitled QUICK-ACTING TOOL BIT HOLDER, the specification and drawings are herein expressly incorporated by reference.

BACKGROUND AND SUMMARY OF THE INVENTION

The invention relates generally to power or hand tool bit holders, variously known as "auxiliary chucks", "chucks", or "adapters", for removably receiving tool bits, such as fastener drivers, drill bits, or the like, for rotation therewith when the power tool is actuated or the hand tool is manually rotated. More particularly, the present invention relates to chuck assemblies or adapters configured for rapid and easy insertion and removal of a tool bit.

Auxiliary chucks for power and hand tools have become increasingly common, especially as the need and desirability of wider versatility in the use of power tools and hand tools has increased. Such auxiliary chucks allow the hand or power tool to be used with any of a number of interchangeable bits. This, in turn, has resulted in demands for greater speed, convenience and ease of insertion and removal of tool bits from such chucks.

In one exemplary type of such conventional quick-release chucks, one or more detented balls are positioned within a hollow, barrel-shaped tool bit holder body and are resiliently biased into engagement with a circumferentially-extending groove or recess on the shank of the tool bit. Although this basic design has performed well, chuck assemblies or bit holders of this type have been found to be inordinately expensive and difficult to manufacture due to the relatively large number of parts required, as well as frequently requiring the operator to actuate a sleeve, collar or other component part during both the insertion and the removal of the tool bit.

Accordingly, the present invention seeks to provide a simple, relatively inexpensive quick-acting chuck assembly or bit holder that requires the operator to actuate its components only upon tool bit removal. A "snap-in" type of chuck assembly is provided for a drill, driver, or other rotary hand or powered tool, with the chuck assembly including a generally cylindrical body having a hex shank at its inner or rearward end for rotatable attachment to a drill or driver. A hollow cylindrically-stepped retraction collar or sleeve is slidably disposed for movement in an axial direction on an intermediate portion of the body, and an outer retaining collar is fixed both axially and circumferentially to the outer end of the body for rotation therewith. The outer retaining collar has a central opening, and the body has a coaxial hollow hex socket or bore formed therein, both of which open toward the outer or forward end of the chuck, in order to allow a tool bit to be inserted into the chuck assembly for rotation therewith.

An angular slot, extending in a radially-inward and axially-forward direction, is formed in the body, providing communication between the radially outer periphery of the body and the internal hollow hex bore. A coil spring surrounds the body and is disposed inside the retraction collar, with the inner or rearward end of the spring engaging a shoulder on the body and with the outer or forward end resiliently biasing the retraction collar forwardly and biasing a retaining clip radially inwardly and axially forwardly toward the bottom or inner end of the angular slot where it intersects with the body's hollow hex bore.

As a tool bit is snapped into the chuck's socket, this retaining clip, which is preferably of a generally U-shaped configuration, is forced to slide rearwardly and radially outwardly in the angular slot, against the bias of the coil spring, in order to allow the bit to be inserted. Once the bit is fully seated in the hex socket, the base portion of the U-shaped clip is resiliently urged back down toward the bottom of the angular slot where it engages the circumferential recess formed on the hex shank of the bit, thus retaining the bit in the hex socket or bore where it can be rotatably driven by the drill or driver to which the chuck assembly or bit holder is attached. The tool bit is removed from the chuck assembly by the operator sliding the retraction collar axially rearwardly along the body, thus compressing the coil spring to allow the retaining clip to retract back up the angular slot and release the tool bit as the tool bit is pulled from the hex socket.

In preferred forms of the present invention, the U-shaped spring clip is directly engaged and biased by the coil spring, and both of its legs are curved inwardly around a portion of the chuck's body so that the clip is self-retaining. In this configuration both the curved legs extend around the body to locations on an opposite side of the body's axis from the clip's base in the angular slot. In this way, the direct contact of the clip with the coil spring is directed axially generally through the center of the coil spring so as to keep the coil spring coaxially aligned with the body and thus to minimize off-axis "cocking" of the coil spring.

Also, in a preferred form of the invention, the corners of the U-shaped clip (at the intersections of the curved legs with the straight base) serve as "stops" for the retraction collar sleeve, by engaging its internal hollow bore as the clip is retracted up the angular slot, in order to prevent over-retraction and consequent jamming of the retraction collar.

In addition, the preferred coil spring can be provided with at least one of its bights, at either the forward or rearward ends, or at both ends, being axially collapsed in order to form one or more "dead coils" at the coil spring end (or ends). This feature allows the coil spring to more flatly abut the spring clip at the forward end of the coil spring, and/or more flatly engage the stepped portion of the body at the rearward end of the coil spring, thus keeping the coil spring and the retraction collar properly coaxially aligned with the body.

Finally, in order to facilitate the ease and speed of insertion or removal of the tool bit, and to greater facilitate the chuck's ergonomics, the retraction collar is preferably formed with one or more discontinuities on its radially outer periphery, preferably in the form of circumferentially-extending ribs, to which a polymeric cover is attached and engagingly retained on the periphery of the retraction collar.

Preferably, a polymeric cover is press-fit over parallel annular ribs formed on the exterior surface of the retraction collar. Ideally, the polymeric cover is formed in a two-shot process, in which an outer layer of thermoplastic elastomer is molded over a copolymer thermoplastic base layer of a contrasting color, such that suitable raised icons, identifiers, logos, or trademarks protrude through the outer layer and are flush with the outer surface of the cover. In the preferred embodiment, the outer layer is black, and the protruding raised portions of the base layer spell out the trademark DeWALT® in yellow letters. As a result, the operator experiences a "soft-grip" tactile sensation that provides an exceptional grip on the chuck assembly, and which further provides a durable, eye-catching display of the manufacturer's livery and identifiers.

In another embodiment of the present invention, a chuck is utilized to retain a reversible tool. The chuck's cylindrical body is elongated and has a hex bore which extends substantially through the body portion. The bore enables the portion of the tool, which is not being used, to be housed within the chuck body. Also, a spring may be retained within the bore to assist in ejecting the tool from within the chuck. Further, the outer sleeve is substantially a right circular cylinder covering substantially the entire chuck body. The retention mechanism for the tool is substantially the same as that of the first embodiment.

Additional objects, advantages, and features of the present invention will become apparent from the following description and the appended claims, taken in conjunction with the accompanying drawings.

BRIEF DESCRIPTION OF THE DRAWINGS

FIG. 6 is a longitudinal or axial exploded side view of the exemplary chuck assembly of FIGS. 1 through 5, and which also illustrates the method of assembly for a chuck assembly according to the invention.

FIGS. 6a and 6b are lateral or radial cross-sectional views, illustrating a portion of the method for assembling the chuck assembly of FIGS. 1 through 6.

DETAILED DESCRIPTION OF THE PREFERRED EMBODIMENTS

Figure 1:
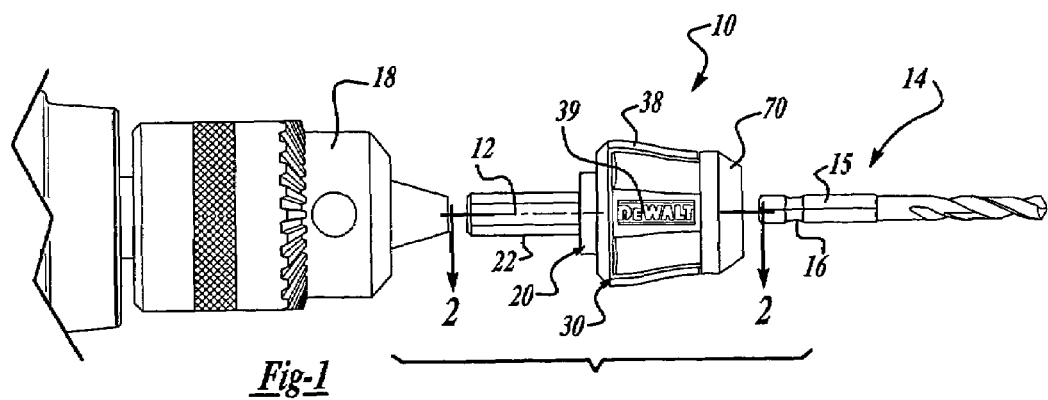
FIG. 1 is a side view of a chuck assembly according to the present invention, and illustrates a drill bit about to be inserted into the chuck assembly.

FIGS. 1 through 6 depict one exemplary preferred embodiment, and FIGS. 7–8 and FIGS. 9–11 depict alternate embodiments, of a chuck assembly or tool bit holder according to the present invention, shown merely for purposes of illustration. One skilled in the art will readily recognize, from the following discussion and the accompanying drawings, that chuck assemblies or bit holders of configurations other than that of this exemplary illustration can also advantageously employ the principles of the present invention.

In FIGS. 1 through 6, an exemplary chuck assembly or bit holder 10 is attachable to a power tool or to a hand tool 18 to be driven for rotation about an axis 12. The chuck assembly 10 is adapted to removably receive a tool bit 14 having a generally hex-shaped shank 15 with a circumferential recess 16 formed therein. The tool bit 14 can be any of a number of well-known bits, including drill bits, nut driver bits, screwdriver bits, or other types of fastener driver bits, for example.

The chuck assembly 10 generally includes a body 20, preferably having a hex shank 22 thereon for mounting the chuck assembly 10 for rotation by a hand tool or a power tool. A preferred hex-shaped socket or bore 24 is formed in the body 20, with the bore 24 opening axially outwardly toward the front or forward end of the chuck assembly 10. A radially outwardly-extending step 26 is formed on the body 20 at a position axially rearward relative to the hex bore or socket 24 and forward of the hex shank 22.

A generally cylindrical hollow retraction collar 30 surrounds a portion of the radially outer periphery of the body 20 and is axially slidable thereon. The hollow retraction collar or sleeve 30 includes a radially inwardly-directed forward flange 32 slidably surrounding a portion of the body 20, with a hollow internal bore 34 within the retraction collar 30 opening in an axially-rearward direction and being of a diameter sufficient to slidably surround the radially outwardly extending step 26 of the body 20.

The body 20 includes an angular slot 50 formed transversely therein, with the slot 50 extending from the radially outer surface of the body 20 in an axially forward and radially inward direction to communicate with the interior of the hex bore or socket 24. A generally U-shaped retaining clip 60 has a central base portion 62 and a pair of preferably curved legs 64 at opposite ends of the central base 62 forming opposite corners 66 thereon. The base 62 of clip 60 is slidably disposed within the angular slot 50, and the two curved legs 64 extend circumferentially around the body 20 to locations thereon that are on an opposite side of the axis 12 from the base 62 and the slot 50. This arrangement can be accomplished by bending the curved legs 64 radially inwardly after the clip 60 is inserted into the slot 50 during assembly of the chuck 10. In this manner, the clip 60 is "self-retaining" on the body 20 and provides other advantages discussed below.

A coil spring 40 surrounds a portion of the body 20 and is disposed between the body 20 and the retraction collar 30. The coil spring 40 abuttingly engages the step 26 on the body 20 and directly engages the clip 60. Thus compressed, the coil spring 40 resiliently biases the clip 60 in forward axial and inward radial directions within the slot 50. Because of this direct abutting engagement with the clip 60 and its curved legs 64 (as discussed above), the resultant reactive axial force exerted by the clip 60 on the coil spring 40 is directed substantially along the axis 12, thus keeping the coil spring 40 coaxially aligned with the body 20.

Figure 3:
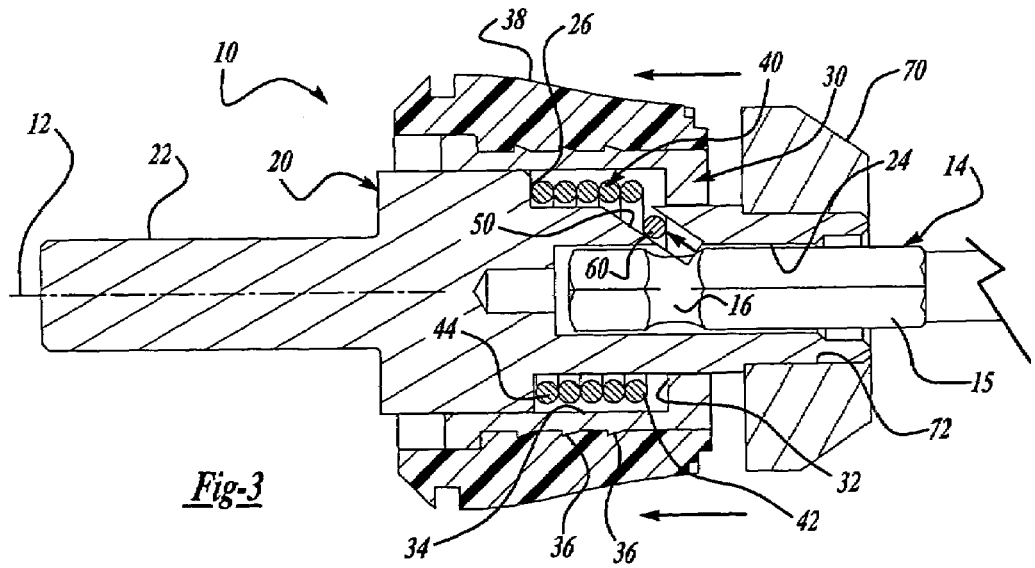
FIG. 3 is a longitudinal cross-sectional view similar to that of FIG. 2, but illustrating the retraction collar being retracted to allow the tool bit to be removed.
Figure 4:
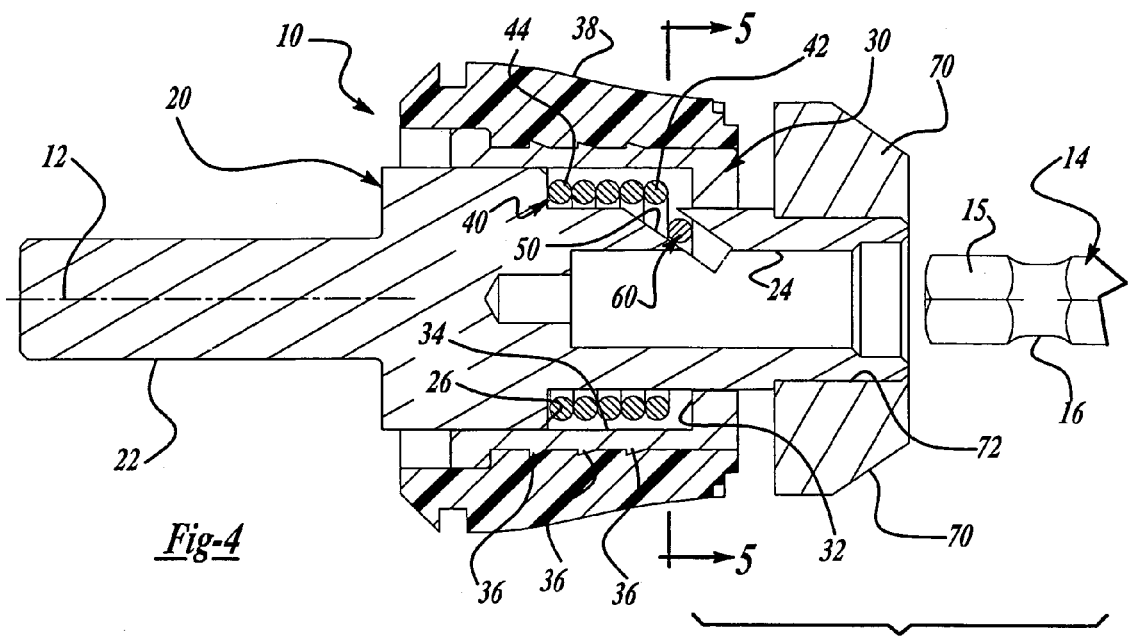
FIG. 4 is a longitudinal cross-sectional view similar to that of FIGS. 2 and 3, but illustrating the tool bit fully removed from the chuck assembly.
Figure 5:
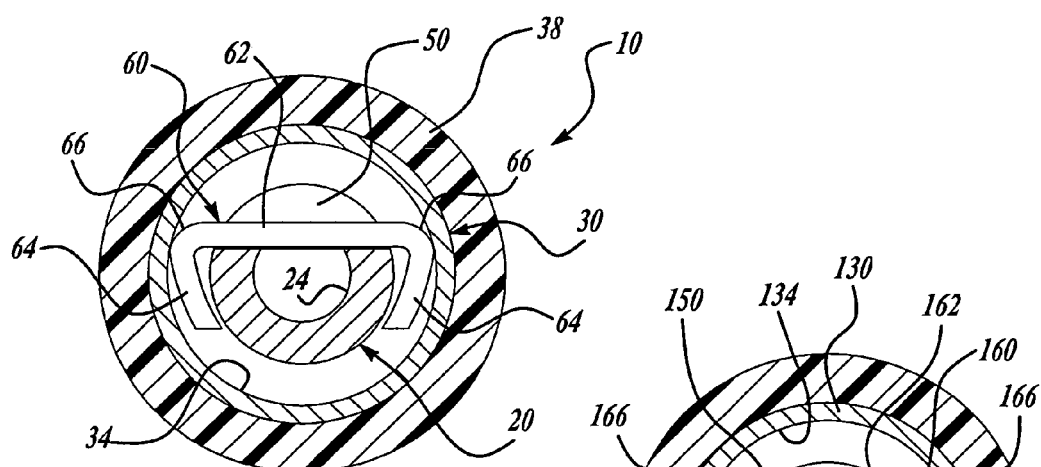
FIG. 5 is a lateral or radial cross-sectional view, taken generally along line 5—5 of FIG. 4.

As can perhaps best be seen in FIGS. 3 through 5, the clip 60 is retracted axially rearwardly and radially outwardly in the slot 50, during axially rearward retraction of the retraction collar 30. At the end of this retraction, the corners 66 (at the intersections of the curved legs 64 with the central base 62) move radially outwardly into contact with the internal surface of the internal hollow bore 34 of the retraction collar 30. This contact substantially prevents further axially rearward movement of the retraction collar 30, thus substantially minimizing the possibility of over-retraction and subsequent cocking or jamming of the retraction collar 30.

Still further, in accordance with the preferred form of the present invention, as can perhaps best be seen in FIG. 6, the coil spring 40 has at least one bight at each of its forward and rearward ends axially collapsed to form respective forward dead coil bights 42 and rearward dead coil bights 44. This dead coil end bight arrangement can optionally be provided at either the forward or rearward ends of the coil spring 40, or preferably at both ends, as shown in the preferred embodiment. Such dead coil bights 44 and 42 at the ends of the coil spring 40 allow the coil spring 40 to engage the step 26 on the body 20 and the curved legs 64 of the clip 60, respectively, in a substantially flat abutting relationship therewith. This, in turn, serves to help maintain the coil spring 40 in a proper, coaxially-aligned relationship with the body 20 and helps eliminate the need for any of the prior art's intermediate sliding sleeves or other such intermediate members between the coil spring 40 and the clip 60. Thus, this arrangement helps eliminate the need for a flat portion on such an intermediate sleeve or member and a corresponding flat portion on the body 20 in order to keep such an intermediate sleeve or other such member properly aligned. This dead coil end bight arrangement, along with the other features of the chuck assembly 10 described above, all contribute to the increased simplification and decreased cost of machining and assembling the chuck assembly 10, as well as helping to minimize the number of required parts.

Figure 2:
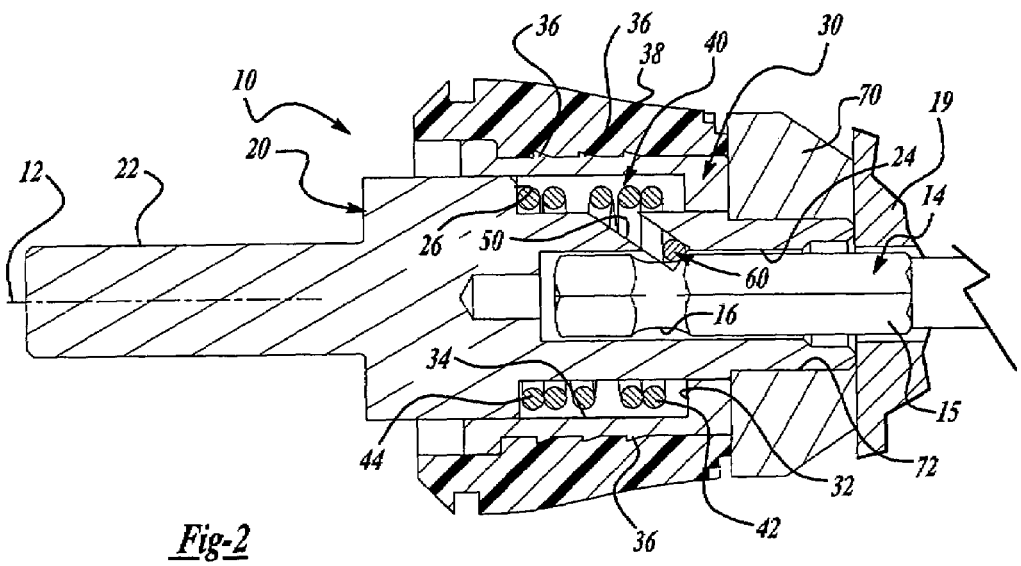
FIG. 2 is a longitudinal or axial cross-sectional view taken generally along line 2—2 of FIG. 1, illustrating the tool bit fully inserted into the chuck assembly.

A retention collar 70, having a central bore 72 extending axially therethrough, is preferably fixed (both axially and circumferentially) onto the forward end of the body 20 and thus serves to retain the above-described components in their assembled condition. The retention collar 79 can be press fitted onto the forward end of the body 20, as well as optionally being retained thereon by a gripping engagement with a knurled portion 74 of the body 20 or similar engagement with other types of surface discontinuities adjacent the forward end of the body 20. This retention collar 70 also serves as a "guard" to prevent the bit from being inadvertently released when the forward end of the chuck assembly 10 engages a workpiece 19, as shown in FIG. 2.

Finally, in order to enhance the appearance of the chuck assembly 10, as well as to greatly improve its ergonomics, a preferred polymeric elastomeric cover 38 is disposed on the retraction collar 30 and retained thereon by gripping engagement with the annular ribs 36 on the outer radial periphery of the retraction collar 30, or with other such gripping surface discontinuities. Preferably, the polymeric cover 38 is press-fit over the parallel annular ribs 36 formed on the exterior surface of the retraction collar 30. Ideally, the polymeric cover 38 is formed in a two-shot process, in which an outer layer of thermoplastic elastomer, such as Vyrum material made by Advanced Elastomer Systems of Akron, Ohio, and having a 55 durometer, is molded over a copolymer thermoplastic base layer, such as a polypropylene/PPC5, made by Washington Pen Plastics, of Washington, Pa., of a contrasting color, such that suitable raised icons, identifiers, logos, or trademarks, such as the logo 39, protrude through the outer elastomeric layer and are flush with the outer surface of the cover 38. In the preferred embodiment, the outer layer is black, and the protruding raised portions of the base layer spell out the trademark DeWALT® 39 in yellow letters. As a result, the operator experiences a "soft-grip" tactile sensation that provides an exceptional grip on the chuck assembly, and which further provides a durable, eye-catching display of the manufacturer's livery and identifiers.

Figure 7:
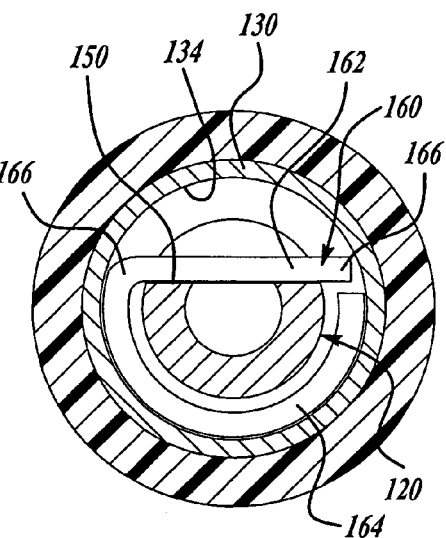
FIG. 7 is a lateral or radial cross-sectional view, similar to that of FIG. 5, but illustrating an alternate embodiment of the retention clip, with the clip in its non-retracted position.
Figure 8:
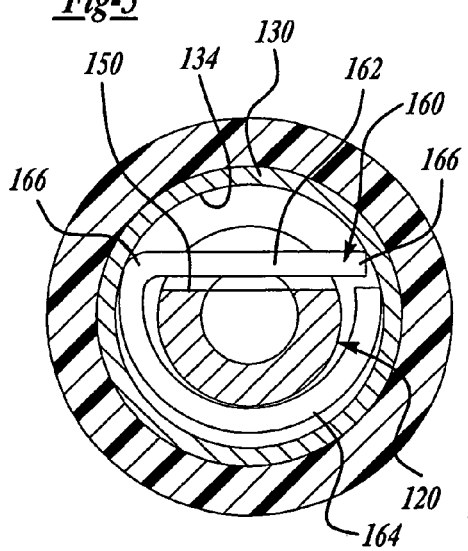
FIG. 8 is a lateral cross-sectional view similar to that of FIG. 7, but illustrating the alternate retention clip in its retracted position.

As an alternate embodiment, as shown in FIGS. 7 and 8, the preferred U-shaped clip 60 can be replaced by the alternate semi-circular clip 160, having a generally straight central base 162 and a curved portion 164 partially surrounding a portion of the body 120. In this embodiment, the base 162 is bent over into the slot 150 after the curved portion 164 is placed onto the body 120. In FIG. 7, this alternate clip 160 is shown in its non-retracted position in the slot 150. In FIG. 8, the clip 160 is shown in its retracted position, with its corners 166 engaging the retraction collar 130 to limit its axial rearward travel in a manner similar to that discussed above in connection with the corners 66 of the preferred clip 160.

The preferred method of assembling the chuck assembly 10 is illustrated by FIGS. 6, 6a and 6b. As shown by bracket 80 in FIG. 6, the coil spring 40 is inserted onto the body 20. The coil spring 40 is then compressed against the step 26 so that the base 62 of the clip 60 can be inserted into the slot 50 as indicated by the bracket 82 and shown in FIG. 6a. At this stage, the legs 64 of the clip 60 are spread sufficiently to allow them to clear the body 20. As shown in FIG. 6b, the legs 64 of the clip 60 are then forcibly bent radially inwardly so that the clip 60 is self-retaining on the body 20.

As indicated by bracket 84 in FIG. 6, the preferred pre-molded cover 38 is press-fitted onto the retraction collar 30 and retained in position by the annular ribs 36. Alternately, however, the cover 38 could be integrally molded by the above-described preferred two-shot process onto the retraction collar 30.

Finally, as indicated in FIG. 6 by brackets 86 and 88, respectively, the collar 30 (with the cover 38 thereon) is slid onto the body 20, surrounding the coil spring 40 and the clip 60 (bracket 86) and held in position against the resilient compression of the coil spring 40 until the retention collar 70 can be press-fitted in a secure, fixed engagement with the preferred knurling 70 on the body 20 (bracket 88).

It should be noted, of course, that a similar assembly method would be employed for the chuck assembly 110, shown in FIGS. 7 and 8, except that the single curved leg 164 would be preformed with the base 162 extending tangentially from one end of the leg 164, and the base 162 would be forcibly bent into its final position in the slot 150 after the curved leg 164 was slid into position on the body 120.

Figure 9:
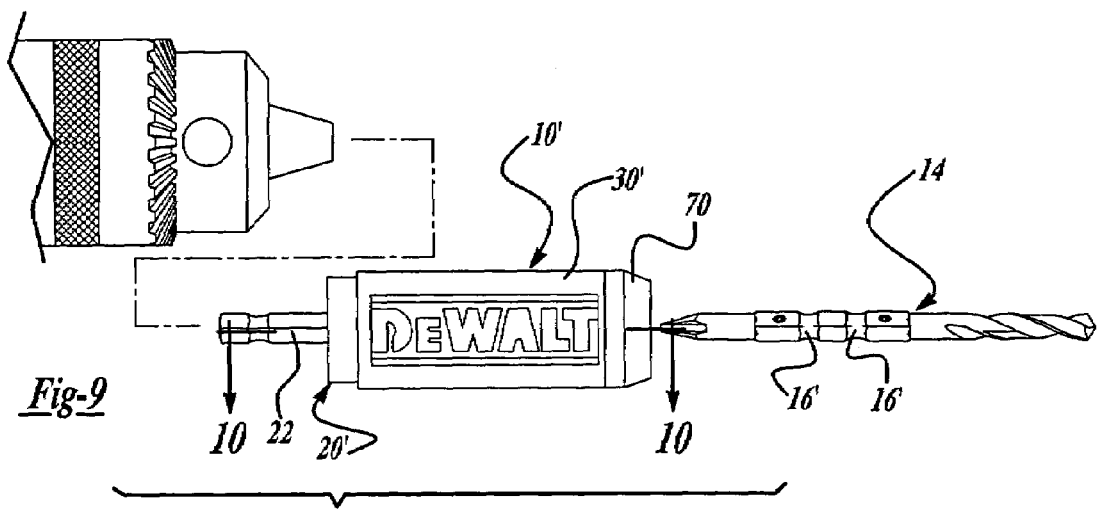
FIG. 9 is a side view of a second embodiment of a chuck assembly according to the present invention.
Figure 10:
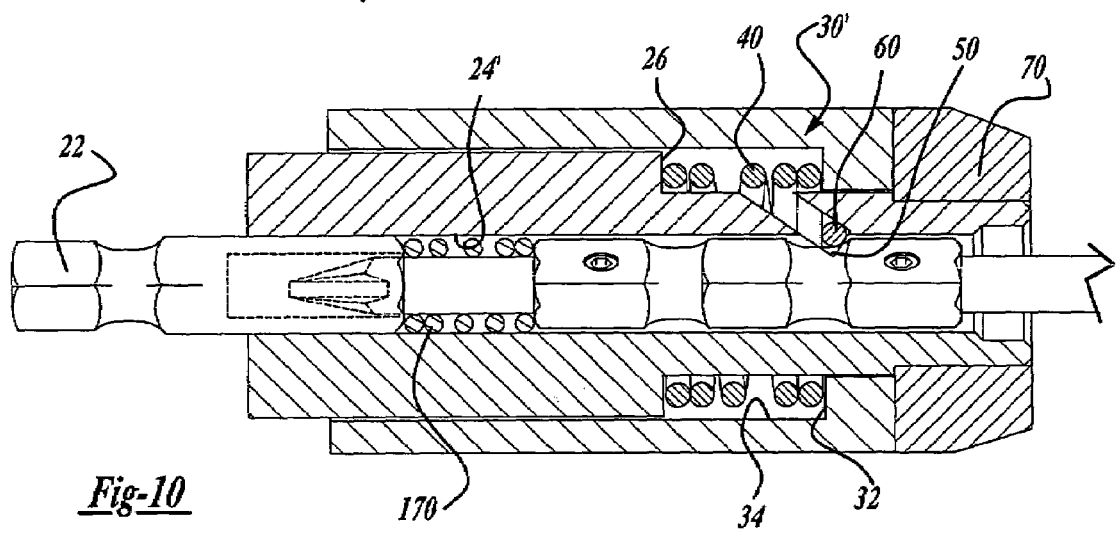
FIG. 10 is a longitudinal cross-section view taken through line 10—10 of FIG. 9 with a tool fully inserted into the chuck position.
Figure 11:
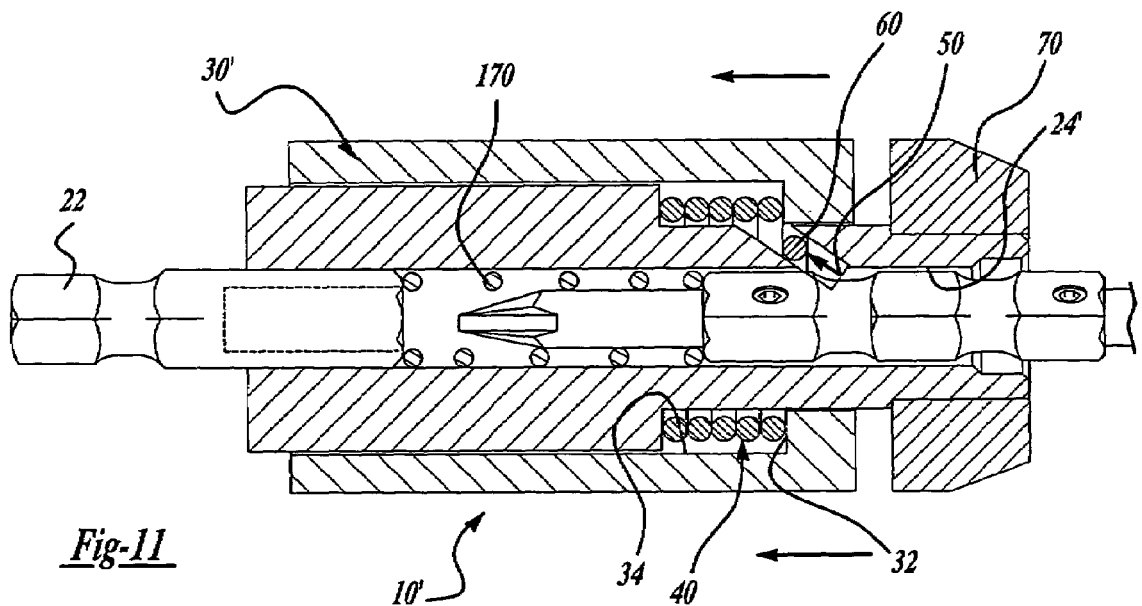
FIG. 11 is a view like FIG. 10 with the retraction collar retracted to enable the tool to be removed from the chuck assembly.

Turning to FIGS. 9–11, a second embodiment of the present invention is shown. The elements which are the same as those previously discussed are designated with the same reference numeral. The elements which correspond to the same element but have been modified are designated with the same reference numeral, primed.

FIGS. 9–11 illustrate a chuck assembly 10' which generally includes a body 20' preferably having a hex shank 22 to mount the chuck assembly for rotation by a hand or power tool. Preferably, a hex-shaped socket or bore 24' is formed in the body 20'. The bore 24' opens axially outwardly toward the front or forward end of the chuck assembly 10'. The bore 24' extends substantially through the entire body 20'. The extended bore 24' enables the tool to have its reversible portion housed within the body 20'. A radially outwardly extending step 26 is formed on the body 20' between the opening of the bore and the forward end of the hex shank 22.

A generally elongated cylindrical hollow retraction collar 30' surrounds substantially the entire outer periphery of the body 20'. The retraction collar 30' is preferably a right circular cylinder. The elongated retraction collar 30' is axially slidable along the body 20'. The elongated retraction collar 30' includes a radially inwardly directed forward flange 32 slidably surrounding a portion of the body 20'. A hollow internal bore 34 is formed within the elongated retraction collar 30', opening in an axially rearward direction. The bore has a diameter sufficient to slidably surround the radial outwardly extending step 26 of the body 20'.

The body 20' includes an annular slot 50 like that described above. The slot retains a U-shaped retaining clip 60 disposed in the annular slot 50 to maintain the tool within the bore 24' like that described above. A spring 40 is positioned about the body 20' in between the steps 26 and 32 to provide biasing of the sleeve 30' with respect to the body 20'. The body 20' has bore 24' which extends substantially through the entire body 20'. The bore 24' may include a spring 170 housed within the bore 24' which assists in the ejection of the tool from within the bore 24'. The bore 24' has a depth within the body 20' so that the tool may have its reversible end housed within the body 20'. Also, the hex shank 22 may be hollow to house a drill bit when it is positioned within the body 20'.

The remainder of the chuck assembly 10' is like that discussed above. The chuck assembly 10' operates as described above to retain the tool in the bore 24' with the clip 60 contacting the recessed portion 16' of the tool 14' to retain the tool within the chuck assembly 10'. The retention mechanism 160 described above may also be utilized in the second embodiment.

The foregoing discussion discloses and describes merely exemplary embodiments of the present invention for purposes of illustration only. One skilled in the art will readily recognize from such discussion, and from the accompanying drawings and claims, that various changes, modifications, and variations can be made therein without departing from the spirit and scope of the invention as defined in the following claims.

What is claimed is:

1. A chuck assembly rotatable about an axis and including an axially-extending body having a coaxially-extending hex-shaped bore therein for receiving a hex-shaped tool with a circumferential recess formed therein removably insertable into the bore, an elongated retraction collar being substantially cylindrical and surrounding at least a portion of the body and being axially slidable thereon, a coil spring surrounding said portion of the body and being disposed within the retraction collar, the coil spring being restrained axially at its rearward end and normally biasing the retraction collar toward an axially forward end of the body, the body including a slot formed therein providing communication between an outer surface of the body and a portion of the bore on a first side of the axis, the chuck assembly further including a clip having a base and two spaced-apart legs extending from ends of said base, said clip having its base disposed within said slot in the body for slidable movement therein and its legs extending circumferentially along opposite sides of the outer surface of the body, said clip being biased axially forwardly by said coil spring so that its base is biased axially forwardly and radially inwardly within said slot, said base being biased toward a retaining engagement with the circumferential recess in the tool when the tool is inserted into the bore in the body, said clip being urged axially rearwardly and radially outwardly by the retraction collar against said bias of said coil spring when the retraction collar is slid axially rearwardly along the body in order to release the tool for removal from the bore in the body, both of said legs of said clip being disposed about the body and extending to a second side of the axis generally opposite said first side of the axis in order to retain said clip thereon, said coil spring directly abutting said legs of said clip on both said first and second opposite sides of the axis with a resultant reactive rearwardly-directed force exerted by said clip on said coil spring being generally centrally directed generally along the axis in order to substantially maintain said coil spring in a generally coaxially-aligned relationship with the body and substantially minimize off-axis cocking of said coil spring on the body during axial movement of the retraction collar on the body.

2. The chuck assembly according to claim 1, further including a retention collar axially and circumferentially fixed to the body at a forward end thereof for rotation therewith, said retention collar retaining said retraction collar and limiting its axially-forward movement on the body.

3. The chuck assembly according to claim 1, wherein said coil spring has at least one bight substantially collapsed axially at its axially-forward end when said coil spring is in its uncompressed state, said collapsed bight forming a dead coil thereon directly engaging said legs of said clip in a substantially flat abutting relationship therewith.

4. The chuck assembly according to claim 3, wherein said clip is generally U-shaped, said legs of said clip being curved and extend generally circumferentially around said portion of the body.

5. The chuck assembly according to claim 3, wherein said coil spring also has at least one bight substantially collapsed axially at its axially-rearward end when said coil spring is in its uncompressed state, said rearward collapsed bight forming a rearward dead coil thereon.

6. The chuck assembly according to claim 5, wherein the body includes a radially outwardly-extending step thereon at a location axially rearward of said slot, said dead coil engaging said radially outwardly-extending step on the body in a substantially flat abutting relationship therewith.

7. The chuck assembly according to claim 6, wherein an inner circumferential surface of said retraction collar closely surrounds said coil spring.

8. The chuck assembly according to claim 1, wherein said clip has opposite clip corners formed by the intersection of said legs with said ends of said base, said clip corners engaging an internal surface of the retraction collar when the retraction collar is slid axially-rearwardly a predetermined distance along said body, said engagement of said clip corners with said retraction collar inner surface serving to limit the axially-rearward travel of the retraction collar and thereby limit the amount of compression of said coil spring.

9. A chuck assembly rotatable about an axis and including an axially-extending body having a coaxially-extending hex-shaped bore therein for receiving a hex-shaped tool with a circumferential recess formed therein removably insertable into the bore, an elongated retraction collar being substantially cylindrical and surrounding at least a portion of the body and being axially slidable thereon, a coil spring surrounding said portion of the body and being disposed within the retraction collar, the coil spring normally biasing the retraction collar toward an axially forward end of the body, the body including a slot formed therein, providing communication between an outer surface of the body and a portion of the bore on a first side of the axis, the chuck assembly further including a clip having a base and a leg portion extending from a first end of said base, said clip having its base disposed within said slot in the body for slidable movement therein and its leg extending about a portion of the outer surface of the body, said clip being biased axially forwardly by said coil spring so that its base is normally biased axially forwardly and radially inwardly within said slot, said base being biased toward a retaining engagement with the circumferential recess in the tool when the tool is inserted into the bore in the body, said clip being urged axially rearwardly and radially outwardly by the retraction collar against said bias of said coil spring when the retraction collar is moved axially rearwardly along the body in order to release the tool for removal from the bore in the body, said leg of said clip extending about a second side of the axis generally opposite said first side of the axis of the body to a location generally adjacent a second opposite end of said base of said clip in order to retain said clip thereon, said coil spring directly abutting said leg of said clip on both said first and second opposite sides of the axis of the body with a resultant reactive rearwardly-directed force exerted by said clip on said coil spring being generally centrally directed generally along the axis in order to substantially maintain said coil spring in a generally coaxially-aligned relationship with the body and substantially minimize off-axis cocking of said coil spring on the body during axial movement of the retraction collar on the body.

10. The chuck assembly according to claim 9, wherein said clip has opposite clip corners formed by said first end of said base and by the intersection of said leg with said second end of said base, said clip corners engaging an inner surface of the retraction collar when the retraction collar is moved axially-rearwardly a predetermined distance along said body, said engagement of said clip corners with said retraction collar inner surface serving to limit the axially-rearward travel of the retraction collar and thereby limit the amount of compression of said coil spring.

11. The chuck assembly according to claim 9, wherein said leg is curved and extends generally circumferentially around said portion of said body.

12. The chuck assembly according to claim 11, wherein an inner circumferential surface of said retraction collar closely surrounds said coil spring.

13. A power tool having a motor, a drive member rotatably interconnected with said motor, and an auxiliary chuck assembly rotatably connected to said drive member for rotation about an axis, said auxiliary chuck assembly including an axially-extending body having a coaxially-extending hex-shaped bore therein for receiving a hex-shaped tool with a circumferential recess formed therein removably insertable into the bore, an elongated retraction collar being substantially cylindrical and surrounding at least a portion of the body and being axially slidable thereon, a coil spring surrounding said portion of the body and being disposed within the retraction collar, the coil spring being restrained axially at its rearward end and normally biasing the retraction collar toward an axially forward end of the body, the body including a slot formed therein providing communication between an outer surface of the body and a portion of the bore on a first side of the axis, the chuck assembly further including a clip having a base and two spaced-apart legs extending from ends of said base, said clip having its base disposed within said slot in the body for slidable movement therein and its legs extending circumferentially along opposite sides of the outer surface of the body, said clip being biased axially forwardly by said coil spring so that its base is biased axially forwardly and radially inwardly within said slot, said base being biased toward a retaining engagement with the circumferential recess in the tool when the tool is inserted into the bore in the body, said clip being urged axially rearwardly and radially outwardly by the retraction collar against said bias of said coil spring when the retraction collar is slid axially rearwardly along the body in order to release the tool for removal from the bore in the body, both of said legs of said clip being disposed about the body and extending to a second side of the axis generally opposite said first side of the axis in order to retain said clip thereon, said coil spring directly abutting said legs of said clip on both said first and second opposite sides of the axis with a resultant reactive rearwardly-directed force exerted by said clip on said coil spring being generally centrally directed generally along the axis in order to substantially maintain said coil spring in a generally coaxially-aligned relationship with the body and substantially minimize off-axis cocking of said coil spring on the body during axial movement of the retraction collar on the body.

14. The chuck assembly according to claim 1, wherein an ejector spring is positioned in said bore for assisting in removing said tool from said body.

* * * * *